United States Patent
Deshpande et al.

(10) Patent No.: US 7,957,319 B2
(45) Date of Patent: Jun. 7, 2011

(54) CLASSIFICATION TECHNIQUES FOR ENCRYPTED NETWORK TRAFFIC

(75) Inventors: Shivani A. Deshpande, Sunnyvale, CA (US); Scott Andrew Hankins, Cupertino, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 181 days.

(21) Appl. No.: 12/463,318

(22) Filed: May 8, 2009

(65) Prior Publication Data

US 2010/0284300 A1 Nov. 11, 2010

(51) Int. Cl.
H04J 1/16 (2006.01)
(52) U.S. Cl. ......... 370/253; 370/229; 370/252; 370/392
(58) Field of Classification Search .................... 370/53, 370/235, 230, 229, 230.1, 231, 232, 233, 370/234, 252, 254, 255, 389, 392, 412, 413, 370/401, 463, 468; 709/224, 223, 250, 235, 709/227, 238, 226, 229, 231; 726/23
See application file for complete search history.

(56) References Cited

U.S. PATENT DOCUMENTS

| | | | |
|---|---|---|---|
| 4,914,650 A | 4/1990 | Sriram | |
| 5,828,846 A | 10/1998 | Kirby | |
| 6,003,077 A | 12/1999 | Bawden | |
| 6,023,456 A | 2/2000 | Chapman | |
| 6,046,980 A | 4/2000 | Packer | |
| 6,219,050 B1 | 4/2001 | Schaffer | |
| 6,285,660 B1 | 9/2001 | Ronen | |
| 6,363,056 B1 | 3/2002 | Beigi | |
| 6,397,359 B1 | 5/2002 | Chandra | |
| 6,502,131 B1 | 12/2002 | Vaid | |
| 6,584,467 B1 | 6/2003 | Haught | |
| 6,625,648 B1 | 9/2003 | Schwaller | |
| 6,628,938 B1 | 9/2003 | Rachabathuni | |
| 6,681,232 B1 | 1/2004 | Sistanizadeh | |
| 6,690,918 B2 | 2/2004 | Evans | |
| 6,701,359 B1 | 3/2004 | Calabrez | |
| 6,738,352 B1 | 5/2004 | Yamada | |
| 6,798,763 B1 | 9/2004 | Kimura | |
| 6,894,972 B1 | 5/2005 | Phaal | |
| 7,120,931 B1 | 10/2006 | Cheriton | |
| 7,154,416 B1 | 12/2006 | Savage | |
| 7,155,502 B1 | 12/2006 | Galloway | |
| 7,193,968 B1 | 3/2007 | Kapoor | |
| 7,215,637 B1 | 5/2007 | Ferguson | |
| 7,224,679 B2 | 5/2007 | Solomon | |
| 7,292,531 B1 | 11/2007 | Hill | |
| 7,296,288 B1 | 11/2007 | Hill | |
| 7,324,447 B1 | 1/2008 | Morford | |
| 7,385,924 B1 | 6/2008 | Riddle | |
| 7,554,983 B1* | 6/2009 | Muppala | 370/392 |

(Continued)

OTHER PUBLICATIONS

U.S. Appl. No. 10/720,329, filed Nov. 2003, Yung.

(Continued)

*Primary Examiner* — Aung S Moe
*Assistant Examiner* — Abdullah Riyami
(74) *Attorney, Agent, or Firm* — Baker Botts L.L.P.

(57) ABSTRACT

Methods, apparatuses and systems directed to detecting network applications whose data flows have been encrypted. The present invention extends beyond analysis of explicitly presented packet attributes of data flows and holistically analyzes the behavior of host or end systems as expressed in related data flows against a statistical behavioral model to classify the data flows.

20 Claims, 4 Drawing Sheets

U.S. PATENT DOCUMENTS

| | | | |
|---|---|---|---|
| 7,664,048 B1 * | 2/2010 | Yung et al. | 370/253 |
| 7,822,837 B1 * | 10/2010 | Urban et al. | 709/223 |
| 7,843,843 B1 * | 11/2010 | Papp et al. | 370/252 |
| 2002/0122427 A1 | 9/2002 | Kamenisky | |
| 2002/0143901 A1 | 10/2002 | Lupo | |
| 2003/0035365 A1 | 2/2003 | Jurdi et al. | |
| 2003/0112764 A1 | 6/2003 | Gaspard | |
| 2003/0185210 A1 | 10/2003 | McCormack | |
| 2004/0125815 A1 | 7/2004 | Shimazu | |
| 2005/0050362 A1 | 3/2005 | Peles | |
| 2005/0055435 A1 * | 3/2005 | Gbadegesin et al. | 709/224 |
| 2005/0063307 A1 | 3/2005 | Samuels | |
| 2005/0108571 A1 | 5/2005 | Lu | |
| 2006/0045014 A1 | 3/2006 | Charzinski | |
| 2007/0206515 A1 * | 9/2007 | Andreasen et al. | 370/255 |
| 2007/0300301 A1 * | 12/2007 | Cangini et al. | 726/23 |
| 2009/0010259 A1 * | 1/2009 | Sirotkin | 370/392 |
| 2010/0118884 A1 * | 5/2010 | Hendel et al. | 370/412 |
| 2010/0192225 A1 * | 7/2010 | Ma et al. | 726/23 |
| 2010/0217886 A1 * | 8/2010 | Seren et al. | 709/231 |

OTHER PUBLICATIONS

U.S. Appl. No. 10/917,952, filed Aug. 2004, Yung.
U.S. Appl. No. 10/938,435, filed Sep. 2004, Riddle.
U.S. Appl. No. 11/019,501, filed Dec. 2004, Muppala.
Bernaille et al., Blind application recognition through behavioral classification, 2005.
Constantinou et al., Identifying Known and Unknown Peer-to-Peer Traffic, Massachusetts Institute of Technology, 2006.
Crotti et al., Traffic Classification through Simple Statistical Fingerprinting, Universita degli Studi di Brescia, Italy, ACM SIGCOMM Computer Communication Review, vol. 37(1), pp. 7-16, Jan. 2007.
Erman et al., Traffic Classification Using Clustering Algorithms, *SIGCOMM'06 Workshops* Sep. 11-15, 2006, Pisa, Italy, Copyright 2006 ACM 1-59593-417-0/06/0009, 2006
Park et al., "Internet traffic classification for scalable QoS provision," in IEEE International Conference on Multimedia and Expo, Toronto, Ontario, Canada, Jul. 2006.
Karagiannis et al., BLINC: Multilevel Traffic Classification in the Dark, *SIGCOMM'05*, Aug. 21-26, 2005, Philadelphia, Pennsylvania, USA, Copyright 2005 ACM 1595930094/05/0008, 2005.
Moore et al., Internet Traf_c Classi_cation Using Baycsian Analysis Techniques, *SIGMETRICS'05*, Jun. 6.10, 2005, Banff, Alberta, Canada, Copyright 2005 ACM 1-59593-022-01/05/0006, 2005.
Nguyen et al., Training on multiple sub-flows to optimise the use of Machine Learning classifiers in real-world IP networks, Accepted Jul. 31, 2006 to be presented at IEEE LCN 2006, Nov. 2006. Paper made possible in part by a grant from the Cisco University Research Program Fund at Community Foundation Silicon Valley, Jul. 2006.

* cited by examiner

CLASSIFICATION TECHNIQUES FOR ENCRYPTED NETWORK TRAFFIC

TECHNICAL FIELD

The present disclosure generally relates to computer networks and, more particularly, to enhanced network traffic classification mechanisms that allow for identification of encrypted data flows, or data flows where attributes necessary to proper classification are otherwise obscured or unknown.

BACKGROUND

Classification of network applications typically involves inspection of packet payloads. Indeed, a common use of bandwidth management devices is to identify, and limit the bandwidth being consumed by, unruly, bandwidth-intensive applications, such as peer-to-peer applications (e.g., Bitorrent, eMule, etc.), and/or other unauthorized applications. Indeed, the rich Layer 7 classification functionality of Packetshaper® bandwidth management devices offered by Blue Coat Systems®, Inc. of Sunnyvale, Calif. is an attractive feature for network administrator, as it allows for accurate identification of a variety of application types. This traffic classification functionality, in many instances, uses a combination of known protocol types, port numbers and application-specific attributes contained in packet payloads to differentiate application traffic traversing the network.

An increasing number of peer-to-peer applications, however, employ data compression, encryption technology, and/or proprietary protocols that obscure or prevent identification of various application-specific attributes, often leaving well-known port numbers as the only basis for classification. In fact, as networked applications get increasingly complicated, data encryption has become a touted feature. Indeed, encryption addresses the concern of security and privacy issues, but it also makes it much more difficult to identify unauthorized applications using encryption, such as the peer-to-peer applications Azureus, BitComet and Limewire. In addition, traffic classification based solely on well-known port numbers can be problematic, especially where the application uses dynamic port number assignments or an application incorrectly uses a well-known port number, leading to misclassification of the data flows. Furthermore, relying only on well-known port numbers often does not allow for classifying traffic on more granular levels when two or more network applications tend to use the same port numbers. In addition, classifying encrypted network traffic as "unknown" and applying a particular rate or admission policy to unknown traffic classes undermines the granular control otherwise provided by bandwidth management devices and, further, may cause legitimate, encrypted traffic to suffer as a result.

SUMMARY

The present invention provides methods, apparatuses and systems directed to detecting network applications whose data flows have been encrypted. As discussed above, typical mechanisms that classify network traffic analyze explicitly presented or readily discoverable attributes of individual packets against an application signature, such as a combination of protocol identifiers, port numbers and character strings. The present invention extends beyond analysis of such explicitly presented packet attributes and holistically analyzes the behavior of host or end systems as expressed in related data flows against a statistical behavioral model to classify the data flows. Implementations of the present invention facilitate the classification of encrypted network traffic. In one embodiment, the enhanced classification mechanisms described herein operate seamlessly with other Layer 7 traffic classification mechanisms that operate on attributes of the packets themselves. Implementations of the present invention can be incorporated into a variety of network devices, such as traffic monitoring devices, packet capture devices, firewalls, and bandwidth management devices.

DESCRIPTION OF EXAMPLE EMBODIMENT(S)

A. Overview & Example Network Environment

Figure 1:
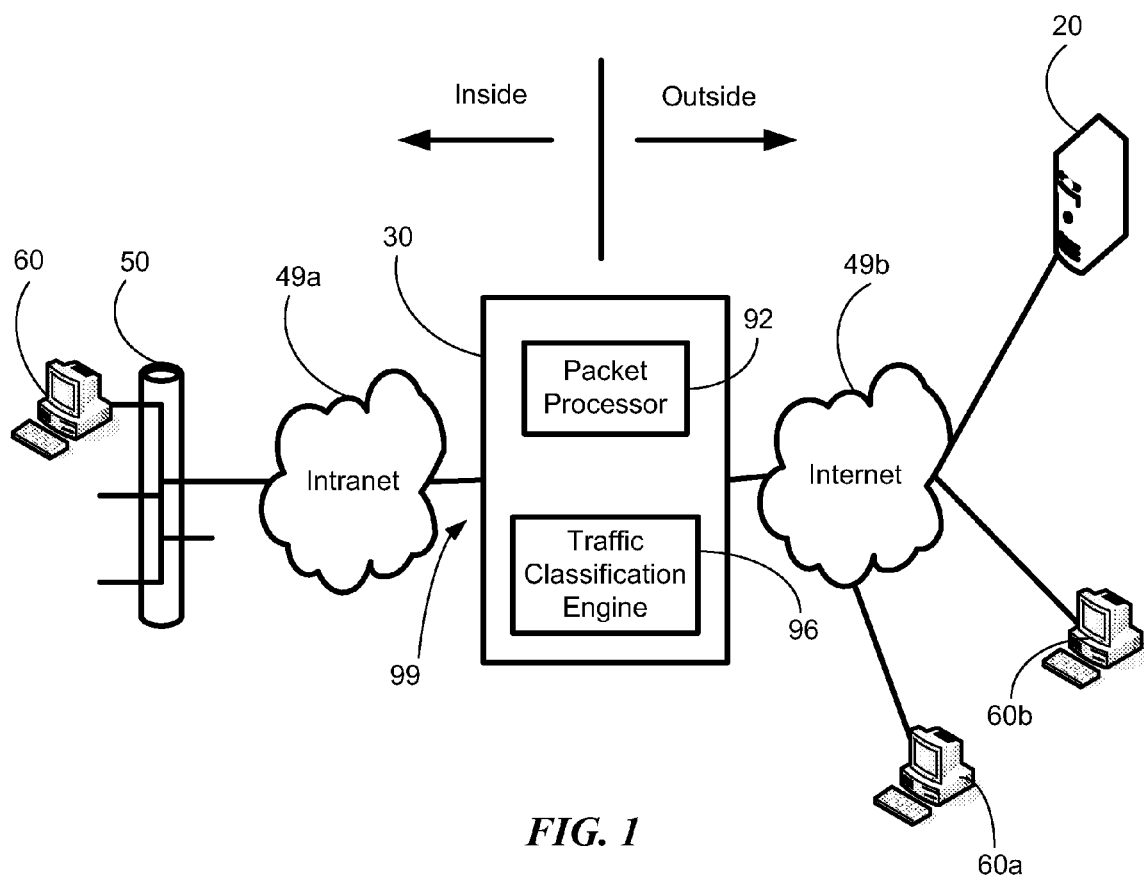
FIG. 1 is a schematic diagram of a computer network environment, in which particular embodiments of the present invention may operate.

FIG. 1 is a schematic representation of a network deployment. As FIG. 1 shows, the computer network environment may comprise one or more hosts (such as servers 20 and clients 60) and one or more network devices 30. According to the example deployment illustrated in FIG. 1, a client 60 is connected to a network 50, such as a Local Area Network (LAN), which itself is operably connected to intranet 49a. Similarly, client 60 as well as peer clients 60a, 60b, are operably connected to Internet 49b. Network traffic between client 60 and any of server 20 and peer clients 60a, 60b may be routed over one or more network paths, where at least one network path includes network path segment 99. As FIG. 1 illustrates, network path segment 99 includes a network device 30. Network 50 may comprise a Local Area Network (LAN) implemented by one or more switches, hubs, bridges, wireless access points, and/or other network devices. In one embodiment, network 50 is an Ethernet (IEEE 802.3) network; however, other link layer protocols can be employed.

Servers 20 host one or more network applications, such as a web site or an enterprise business application, accessible to one or more clients 60, 60a, 60b. Servers 20 may include HTTP server, file server, media server, streaming media server and/or other functional modules to deliver network applications over the computer network environment. Servers 20 may establish HyperText Transport Protocol (HTTP) and/or TCP connections directly with clients 60, 60a, 60b. Clients 60, 60a, 60b are computing systems, such as desktop computers, laptop computers and mobile devices, that host client applications that access servers 20 and other hosts operably connected to the computer network environment. Clients 60, 60a, 60b host one or more network applications, at least one of which is a peer-to-peer application (such as Azureus, Limewire, and the like) that offers users the option to encrypt network traffic.

Network device 30 is an intermediate system that is operationally situated between client 60 and server 20 and clients 60a, 60b. Network device 30 is operative to detect transport layer data flows, such as Transport Control Protocol (TCP) flows, transmitted between hosts and to classify the data flows. The functionality of network device 30 described herein may be incorporated into a variety of different network devices, such as bandwidth management devices, protocol accelerators, gateways, proxies, firewalls and the like.

B. Flow Identification & Traffic Classification

In a particular implementation, network device 30 includes one or more functional modules, such as a packet processor 92 and a traffic classification engine 96. Packet processor 92 may be implemented as a set of computer-readable instructions embodied in software or hardware, or a combination of hardware and software. For example, packet processing operations, such as packet parsing and maintaining flow state information, may be implemented by a network processing unit (NPU), while higher level operations are implemented in software. Similarly, traffic classification engine 96 may be implemented as one or more software modules, hardware modules or a combination of hardware and software.

B.1. Packet Processing and Host Database

In one embodiment, the packet processor 92 is operative to process data packets, such as detecting new data flows, parsing the data packets for various attributes (such as source and destination addresses, and the like) and storing packet attributes in a buffer structure, and maintaining one or more flow variables or statistics (such as packet count) in connection with the data flows and/or the source/destination hosts. The traffic classification engine 96, as discussed more fully below, is operative to classify data flows based on one or more attributes associated with the data flows. In one embodiment, traffic classification engine 96 stores traffic classes, in association with pointers to traffic management policies or pointers to data structures defining such traffic management policies. Other policies, such as security policies, transcoding policies, redirection policies, admission control policies and the like, can be associated with the traffic classes.

As discussed above, packet processor 92, in one implementation, is operative to detect new data flows, instantiate data structures associated with the flows and parse packets to populate one or more fields in the data structures. In one embodiment, when packet processor 92 encounters a new data flow it stores the source and destination IP addresses contained in the packet headers in a host database. Packet processor 92 further constructs a flow object including attributes characterizing a specific flow between two end systems. Other flow attributes in the flow object may include application specific attributes gleaned from layers above the TCP layer, such as codec identifiers for Voice over IP calls, Citrix database identifiers, and the like. Packet processor 92 also stores meta information relating to the received packets in a packet buffer—a memory space, typically in dynamic random access memory (DRAM), reserved for packets traversing network device 30. In one embodiment, the packets are stored in the packet buffer with a wrapper including various information fields, such as the time the packet was received, the packet flow direction (inbound or outbound), and a pointer to the flow object corresponding to the flow of which the packet is a part.

In typical network deployments, the majority of data flows are generally TCP or UDP flows. However, any suitable transport layer flow can be recognized and detected. As discussed more fully below, in one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example, packet processor 92 can determine a new data flow by detecting connection handshake packets, such as SYN, SYN/ACK, and/or ACK packets. However, a new data flow, depending on the network protocol associated with the flow, can simply be a data flow for which there is no corresponding flow object. For example, with UDP and GRE flows (where there is no explicit connection or handshake mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the last packet and the time of the current packet is greater than the threshold, the current packet is deemed part of a new flow. In another implementation, a background and/or separate process can periodically compare the last packet times associated with a flow to a threshold period of time and deem the flow terminated if the last packet time is beyond the threshold period of time. The termination of TCP connections is typically detected by identifying FIN packets; however, the timeout mechanisms discussed above can be used in situations where a FIN packet is not detected.

In one embodiment, a flow object includes such attributes as pointers to the "inside" and "outside" IP addresses in the host database, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980 and U.S. Pat. No. 6,591,299, as well as others incorporated by reference herein, disclose classification of data flows for use in a packet-based communications environment. FIG. 1 illustrates the concept associated with inside and outside addresses. As discussed above, in one embodiment, a flow object includes an "inside" and "outside" address relative to network device 30. See FIG. 1. Generally, the "inside" address corresponds to hosts within a given administrative domain and operationally on one side of the network device 30. For a TCP/IP packet, packet processor 92 can compute the inside and outside addresses based on the source and destination network addresses of the packet and the direction of the packet flow. In some implementations, packet processor 92 can also identify ingress and egress network interfaces for the packets as part of this determination.

In one embodiment, packet processor 92 creates and stores flow objects corresponding to data flows in a flow database. In one embodiment, flow object attributes include flow state parameters, such as TCP connection status, timing of last packets in the inbound and outbound directions, speed information, apparent round trip time, packet count, etc. Flow object attributes further include at least one traffic class identifier (or pointer(s) thereto) associated with the data flow, as well as policy parameters (or pointers thereto) corresponding to the identified traffic class. Operation of traffic classification engine 96 identifies one or more traffic classes to be associated with the data flow. In one embodiment, to facilitate association of an existing flow object to subsequent packets associated with a data flow or connection, the flow database further maintains a flow hash table including a key comprising a hashed value computed from a string comprising the inside IP address, outside IP address, inside port number, outside port number, and protocol type (e.g., TCP, UDP, etc.) associated with a pointer to the corresponding flow object. According to this embodiment, to identify whether a flow object exists for a given data flow, packet processor 92 hashes the values identified above and scans the hash table for a matching entry. If one exists, packet processor 92 associates the pointer to the corresponding flow object with the packets in the data flow.

Packet processor 92, in one implementation, maintains certain data in the host database relative to the hosts identified in the data flows traversing network device 30. Packet processor 92, in one embodiment, maintains, inter alia, for each host IP address 1) the number of concurrent connections (Conn); 2) the current data flow rate (Curr rate) (i.e., the rate of new connections); and 3) the average bits per second (bps) over a one minute interval (1 Min avg). In addition, in one implementation, the host database maintains for each host IP address the following fields: 4) the number of new flows or connections for which the host is a client over the last minute; 5) the number of new flows or connections for which the host is a server over the last minute; and 6) the number of failed flows corresponding to a given host. In some implementations, the host database may also be configured to maintain: 7) the number of current or existing TCP (or other handshake-oriented protocol) connections for which the host is a client; 8) the number of current UDP (or other similar protocol) connections for which the host is a client; 9) the number of current or existing TCP (or other handshake-oriented protocol) connections for which the host is a server; and 10) the number of current UDP (or other similar protocol) connections for which the host is a server. As discussed above, packet processor 92 is operative to identify new data flows, as well as the termination of existing data flows, and updates the statistics identified above as data flows traverse network device.

Packet processor 92 also maintains, for each inside host IP address, additional counter values in a table or other data structure. In a particular implementation, packet processor 92 maintains counter values for the following events: 1) the number of data flows corresponding to the host that have been classified as a first peer-to-peer application (such as BitTorrent), 2) the number of data flows corresponding to the host that have been classified as a second peer-to-peer application (such as eDonkey), 3) the number of data flows corresponding to the host that have been classified as a third peer-to-peer application (such as Gnutella), 4) the number of unresolved or open connection handshakes; 5) the number of Internet Control Message Protocol (ICMP) flows associated with the host; and 6) the number of Simple Service Discovery Protocol (SSDP) flows associated with the host. In other implementations, the table can contain additional counts corresponding to different event or data flow types.

In one embodiment, a process executing in the packet processing path, for example, can collect the raw data at periodic intervals for subsequent evaluation by other processes or modules, such as traffic classification engine 96. In one implementation, the event counters described above are maintained over a time interval (such as 30 seconds) and reset at the start of each interval. Before resetting the counter values, the current values of the counters overwrite corresponding past counter value fields. Accordingly, for each counter value and for each inside host, there exists a past counter value that indicates the corresponding value over the previous interval and a current counter value that indicates the current count during the current interval. As discussed below, traffic classification engine 96, in one implementation, is operative to access these values, as well as other data structures (e.g., the flow database) to classify a data flow.

B.2. Traffic Classification

Traffic classification engine 96, in one implementation, is operative to classify data flows on two different frameworks. That is, traffic classification engine 96 is operative to classify traffic, according to a first framework, based on attributes of individual packets of the data flows that are readily discoverable or unconcealed by encryption or compression. If a data flow is not classified applying this first framework, traffic classification engine 96 applies a second traffic classification framework that, as discussed herein, involves a statistical evaluation of certain data flows and other events associated with the host to potentially classify the data flow. In other words, if the otherwise unknown or unclassifiable data flow is associated with a host that appears to be running a peer-to-peer application, traffic classification engine 96 classifies the data flow as a peer-to-peer application. Otherwise, the data flow is assigned an unknown or default traffic class. Of course, other arrangements are possible. For example, the second traffic classification framework could be applied exclusively, or at least before the first classification framework. The arrangement described above is preferred, in certain implementations, as the majority of network traffic is non-encrypted or can otherwise be classified based on non-concealed data flow attributes. Accordingly, the behavioral matching operations described below are applied only in cases where the extra processing is required.

According to this first framework, a traffic class has at least one attribute defining the criterion(ia) against which data flow attributes are analyzed for the purpose of determining a matching traffic class. For example, a traffic class can be defined by configuring an attribute defining a particular well-known port number in combination with other attributes. Of course, a particular traffic class can be defined in relation to a variety of related and/or orthogonal data flow attributes. U.S. Pat. No. 6,412,000 and U.S. patent application Ser. No. 10/039,992 describe some of the data flow attributes that may be used to define a traffic class. In one embodiment, traffic classification engine 96 includes functionality allowing for classification of network traffic based on information from layers 2 to 7 of the OSI reference model.

C. Example Operation

Implementations of the invention are based on heuristic observations of the behavior of hosts executing a given network application, such as a peer-to-peer application. In connection with peer-to-peer applications—such as Azureus, BitComet, and Limewire, for example—it has been observed that operation of such applications on a host generates a number of data flow types and other events associated with that host. For example, it has been observed that peer-to-peer applications executing on hosts generate a relatively large number of Simple Service Discovery Protocol (SSDP) flows. In addition, peer-to-peer clients tend to transmit User Datagram Protocol (UDP) traffic to hosts that may not be running the peer-to-peer application, causing the destination hosts to respond with Internet Control Message Protocol (ICMP) packets. For similar reasons, there also may be a relatively large number of unresolved connection attempts or uncompleted connection handshakes associated with a given host. Based on these observations, there exists a strong association between these events and peer-to-peer traffic for any particular host. As discussed below, by modeling this behavior and observing the behavior of hosts relative to this modeled behavior, encrypted traffic flows that were otherwise not amenable to classification into a network application or network application type are subject to classification.

As discussed above, the first classification framework implemented by traffic classification engine 96 can be leveraged to identify SSDP, ICMP and different peer-to-peer flows (that are not encrypted) for a particular host. For encrypted traffic not otherwise capable of classification into a given network application, network device 30 can quantify the associatively between these different types of flows using a "Flow Affinity Index" (FAI). The FAI provides a measure of the probability of encountering more peer-to-peer flows from a host given the current number of P2P, ICMP, SSDP flows and unresolved TCP connection attempts seen for that host. As discussed herein, the network device 30 maintains, for a given host, counts of events correlated with a given network application (such as a specific peer-to-peer application) or type of network application (such as peer-to-peer applications generally) over a rotating sampling interval. If a data flow associated with that host cannot be otherwise classified, the network device computes a flow affinity value for the host and compares it to a flow affinity threshold value. If the flow affinity value crosses the threshold, the network device classifies the data flow as that particular network application or network application type.

In one implementation, the FAI for each host is defined as:

$$FAI = \sum_{i \in S} corr_i * n_i$$

where service S={BT, EDON, GNUT, SSDP, ICMP, CONN_ATT_STD};

$corr_i$ is the correlation of flows with service "i" with P2P flows; and $n_i$ is the number of flows with service "i" within certain time period.

In the implementation set forth above, BT corresponds to BitTorrent, EDON to eDonkey, and GNUT corresponds to Gnutella. Each of BT, EDON and GNUT correspond to the number of data flows (typically unencrypted) that have been definitively classified under the first classification framework discussed above, as opposed to the second classification framework involving determination and comparison of FAI values. Furthermore, one skilled in the art will recognize that other peer-to-peer applications can be used in addition to or in lieu of the peer-to-peer applications identified above. The actual peer-to-peer applications tracked will depend on the current state of development of peer-to-peer applications and those that are widely deployed in the network environment. CONN_ATT_STD refers to the count of the open or unresolved connection attempts associated with a given host, whether the host is a server or client relative to the unresolved connections.

In a particular implementation, the classification framework has two phases: a learning phase and a real-time classification phase. As discussed above, in the real-time classification phase, an FAI is computed for a host and compared to a threshold FAI value (THRESH) to decide whether to classify a data flow as a peer-to-peer application. The learning phase involves the analysis of traffic flow data gathered across a plurality of hosts in order to intelligently set the correlation values ($corr_i$) and the threshold FAI value (THRESH).

C.1. Learning Phase

Initially, network device 30 may be pre-configured with an initial or default value for the threshold FAI value (THRESH) and the correlation values ($corr_i$). Network device 30 may adjust the threshold FAI value (THRESH) on a periodic basis, such as every 24 hours, or in response to some triggering event. In one implementation, the learning or estimation phase is computed on an aggregate basis without separation as per individual hosts.

Figure 4:
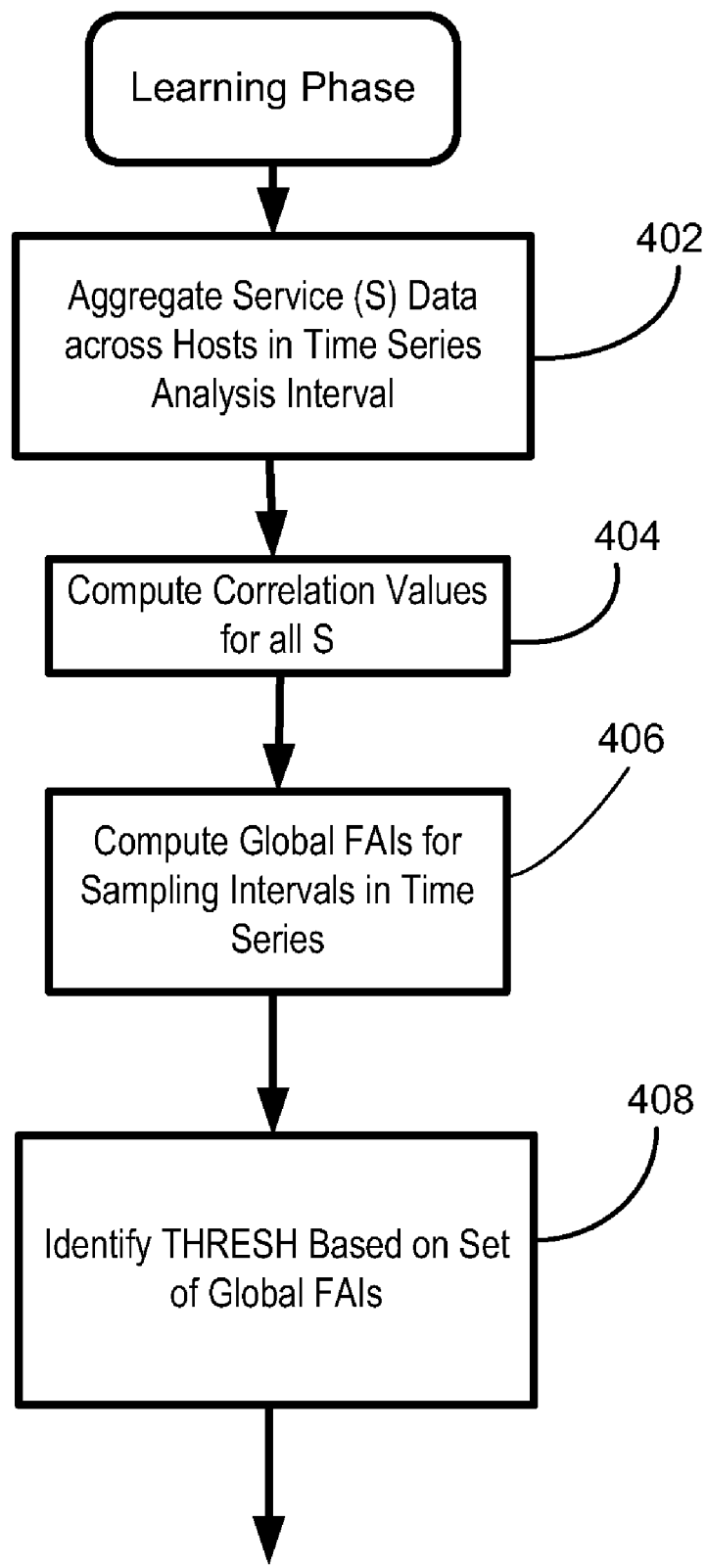
FIG. 4 is a flow chart showing an example method directed to processing packets to be returned to a router for normal forwarding.

In one implementation (and with reference to FIG. 4), network device 30 (or a separate host, such as a network management system that receives the data from network device 30) develops a time series of data observed over an analysis interval, such as 2 to 3 days (402). The time series of data is broken out over a sampling interval of 30 seconds. In other words, each sampling interval includes counts for the data flows and other events of interest encountered over the sampling interval across all hosts on an aggregate basis. In one implementation, the counts for the peer-to-peer application services (BT, EDON, GNUT) are aggregated into one peer-to-peer application count value. Accordingly, for all thirty-second intervals of the analysis interval, counts ($n_i$) are obtained for all services S (see above) with the peer-to-peer application services being aggregated. Based on the counts ($n_i$) in each sampling interval of the time series, network device 30 computes the correlation values ($corr_i$) representing the degree of correlation between the count type and peer-to-peer traffic (404). For example, based on the time series, network device 30 computes a correlation ($corr_i$) between SSDP flows and peer-to-peer flows.

Additionally, network device 30, to determine a threshold FAI value (THRESH), then computes a global FAI value for each sampling interval in the time series based on the newly computed correlation values and the observed aggregate counts ($n_i$) (406). The set of global FAI values form a time series of FAI for the network traffic observed across all hosts over the analysis interval. The "Tth" quantile of this time series, in one implementation, is chosen as the value of the threshold FAI value (THRESH) (408). In experiments, the inventors have found that a value of T=0.7 proved effective. Of course, other values of T may be used without departing from the scope of the invention. Generally, THRESH should be chosen such that the threshold is not crossed except when it is more likely than not that the data flow is actually peer-to-peer traffic. Therefore, T will generally be greater than 0.5. Of course, if an implementer would rather adopt a more aggressive classification scheme and tolerate false positives, T could be lower than 0.5. Accordingly, the learning phase allows network device 30 to adapt to changing conditions based on actual observations of network traffic in the deployment environment.

C.2. Classification Phase

Figure 3:
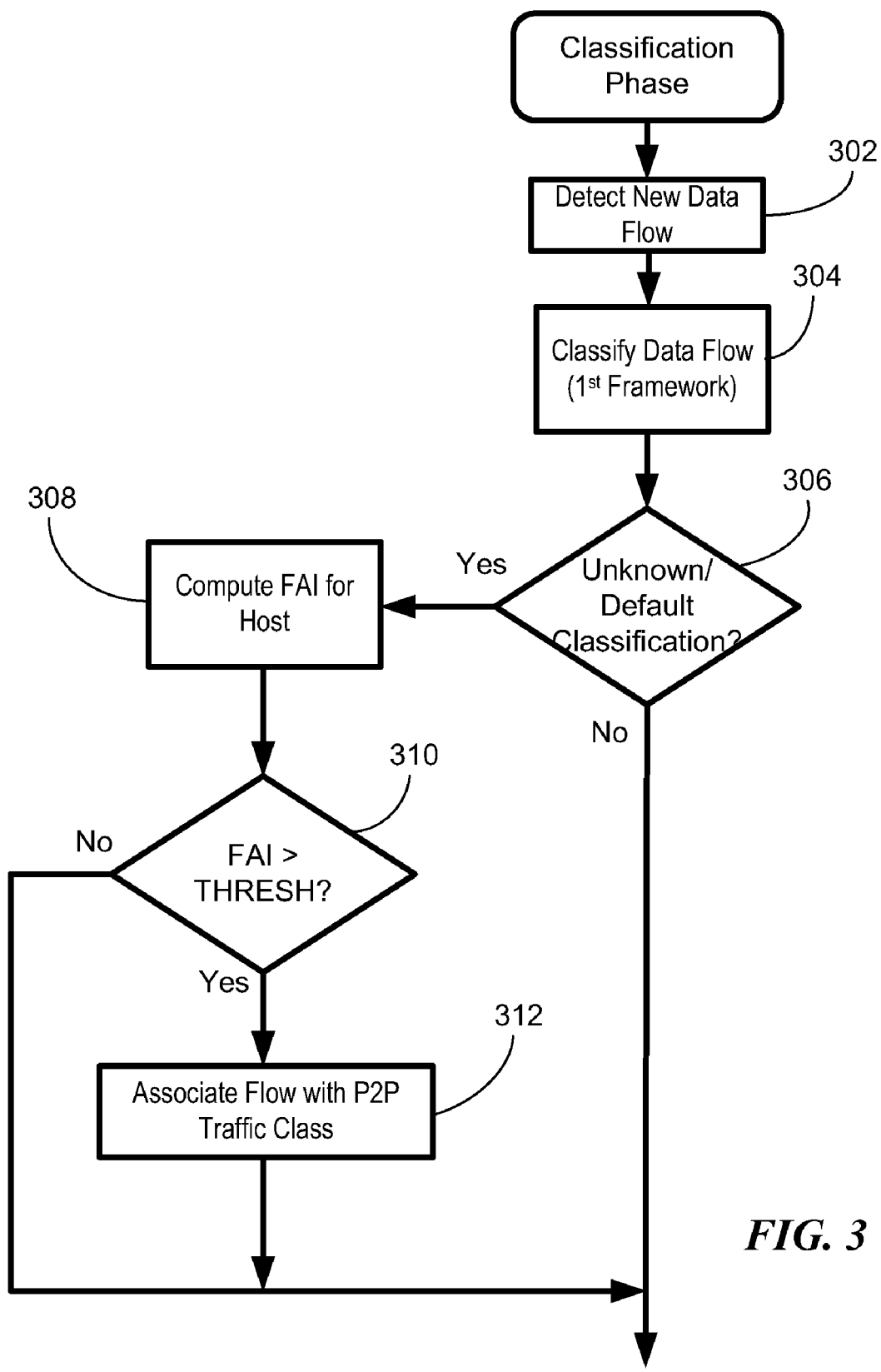
FIG. 3 is a flow chart setting forth an example method directed to classifying data flows according to first and second classification frameworks.

FIG. 3 illustrates a process flow, according to one possible implementation, that incorporates the two classification frameworks. As FIG. 3 provides, when packet processor 92 of network device 30 detects a new data flow (302), traffic classification engine 96 initiates classification of the data flow according to a first traffic classification framework discussed above (304). Traffic classification engine 96 may have to inspect the first N packets of the data flow until it can definitively classify the data flow into one of a plurality of network applications, such as accounting application traffic, Citrix® traffic, Oracle® database traffic and the like.

If traffic classification engine 96 cannot definitively classify the data flow, it assigns a default (unknown) traffic class to the data flow. As FIG. 3 illustrates, if traffic classification engine 96 cannot definitively classify the data flow according to the first classification framework (306), it proceeds to a second classification framework. In one implementation, traffic classification engine 96 computes an FAI value for the "inside" host associated with the data flow (308) based on the count values (n$_i$) corresponding to the past 30-second time interval (see Section B., above). If the computed FAI exceeds the FAI threshold value (THRESH) (310), traffic classification engine 96 associates the data flow with a P2P traffic classification (312).

The foregoing classification framework is very useful in detecting encrypted peer-to-peer application traffic because it does not depend on examining payloads of packets in the data flows. False positive errors, i.e. misclassifying non-P2P traffic as P2P in this case, can be reduced by using the scheme only when a data flow can not be classified according to a packet-content-based classification framework. Another advantage of this classification framework is that it adapts to changes in the host behavior very quickly. Once the host stops generating a large number of P2P-related traffic, its FAI will change accordingly and the flows for that host will no longer be marked as peer-to-peer traffic.

D. Example Computing System Architectures

While the foregoing processes and mechanisms can be implemented by a wide variety of physical systems and in a wide variety of network environments, the network device systems described below provide example computing system architectures for didactic, rather than limiting, purposes.

Figure 2:
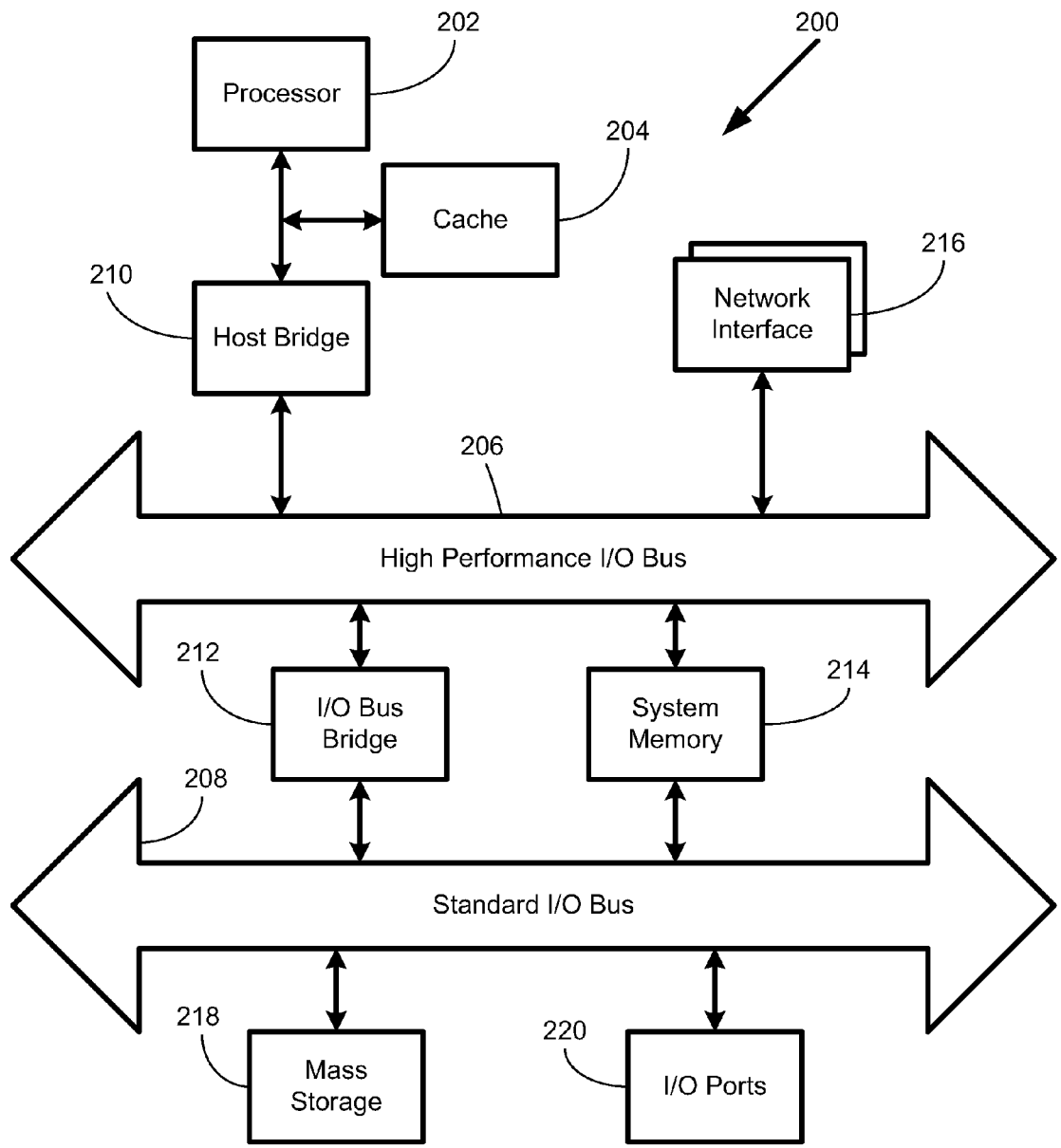
FIG. 2 is a functional block diagram illustrating an example network device hardware system architecture.

FIG. 2 illustrates an example computing system architecture, which may be used to implement a network device 30. In one embodiment, hardware system 200 comprises a processor 202, a cache memory 204, and one or more executable modules and drivers, stored on a computer readable medium, directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above-described functions implemented in the network device 30, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments, only a single bus may exist, with the components of hardware system 200 being coupled to the single bus. Furthermore, hardware system 200 may include additional components, such as additional processors, storage devices, or memories.

As discussed below, in one implementation, the operations of the network device described herein are implemented as a series of executable modules run by hardware system 200. In a particular embodiment, a set of software modules or drivers implements a network communications protocol stack, including a link layer driver, a network layer driver, one or more transport layer modules (e.g., TCP, UDP, etc.), session layer modules, application layer modules and the like. The foregoing functional modules may be realized by hardware, executable modules stored on a computer readable medium, or a combination of both. For example, the functional modules may comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. Any suitable operating system may be used, such as the Windows Operating System offered by Microsoft Corporation, the Apple Macintosh Operating System, available from Apple Computer Inc. of Cupertino, Calif., UNIX operating systems, LINUX operating systems, BSD operating systems, and the like. Of course, other implementations are possible. For example, the proxy and caching functionalities described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present invention has been explained with reference to specific embodiments. For example, while embodiments of the present invention have been described as operating in connection with peer-to-peer applications, the present invention can be used in connection with any network application where encryption is employed. Other embodiments will be evident to those of ordinary skill in the art. It is therefore not intended that the present invention be limited, except as indicated by the appended claims.

What is claimed is:

1. A method comprising:
  receiving, at a network device, a data flow associated with a host;
  accessing a memory maintaining a data structure comprising one or more count values for the host, wherein each of the count values correspond to a number of events detected over a time interval and wherein each event corresponding to a count value exhibits a correlation to a network application;
  determining a flow affinity value by multiplying each count value by a correlation value corresponding to the count value to yield a component product and summing the component products for each count value to yield the flow affinity value; and
  classifying the data flow as the network application based on a comparison of the flow affinity value to a threshold flow affinity value.

2. The method of claim 1 further comprising modifying the threshold flow affinity value over time based on analysis of network traffic observed at the network device.

3. The method of claim 1 further comprising modifying the correlation values corresponding to the one or more count values over time based on analysis of network traffic observed at the network device.

4. The method of claim 1 wherein one of the one or more count values corresponds to a number of service discovery data flows associated with the host.

5. The method of claim 1 wherein one of the one or more count values corresponds to a number of unresolved transport layer connection attempts associated with the host.

6. The method of claim 1 wherein one of the one or more count values corresponds to a number of control message data flows associated with the host.

7. The method of claim 1 wherein one of the one or more count values corresponds to a number of data flows associated with the host that have been classified according to a separate classification framework.

8. The method of claim 1 further comprising incrementing one or more of the count values for the host as events are detected; and
  at periodic intervals:
    storing the current count values in a data structure as previous values for use in the accessing and determining steps; and
    resetting the one or more count values.

9. A method, comprising:
  receiving, at a network device, a data flow associated with a host;
  applying a first classification framework to classify the data flow based on attributes of individual packets of the data flow that are readily discoverable or unconcealed by encryption;
  if the data flow is not classified into a network application by applying the first classification framework, then applying a second classification framework, wherein the second classification framework comprises
  accessing a memory maintaining a data structure comprising one or more count values for the host, wherein each of the count values correspond to a number of events detected over a time interval and wherein each event corresponding to a count value exhibits a correlation to a network application;
  determining a flow affinity value by multiplying each count value by a correlation value corresponding to the count value to yield a component product and summing the component products for each count value to yield the flow affinity value; and
  classifying the data flow as the network application based on a comparison of the flow affinity value to a threshold flow affinity value.

10. The method of claim 9 further comprising modifying the threshold flow affinity value over time based on analysis of network traffic observed at the network device.

11. The method of claim 9 further comprising modifying the correlation values corresponding to the one or more count values over time based on analysis of network traffic observed at the network device.

12. The method of claim 9 further comprising modifying the correlation values corresponding to the one or more count values and the threshold flow affinity value over time based on analysis of network traffic observed at the network device.

13. An apparatus, comprising:
  one or more network interfaces,
  a memory;
  one or more processors;
  one or more code modules comprising computer-executable instructions stored on a computer readable medium, the instructions readable by the one or more processors, the instructions, when and executed, for causing the one or more processors to:
    receive a data flow associated with a host;
    access the memory maintaining a data structure comprising one or more count values for the host, wherein each of the count values correspond to a number of events detected over a time interval and wherein each event corresponding to a count value exhibits a correlation to a network application;
    determine a flow affinity value by multiplying each count value by a correlation value corresponding to the count value to yield a component product and summing the component products for each count value to yield the flow affinity value; and
  classify the data flow as the network application based on a comparison of the flow affinity value to a threshold flow affinity value.

14. The apparatus of claim 13 further comprising computer-executable instructions for causing the one or more processors to
  modify the threshold flow affinity value over time based on analysis of network traffic observed at the network device.

15. The apparatus of claim 13 further comprising computer-executable instructions for causing the one or more processors to
  modify the correlation values corresponding to the one or more count values over time based on analysis of network traffic observed at the network device.

16. The apparatus of claim 13 wherein one of the one or more count values corresponds to a number of service discovery data flows associated with the host.

17. The apparatus of claim 13 wherein one of the one or more count values corresponds to a number of unresolved transport layer connection attempts associated with the host.

18. The apparatus of claim 13 wherein one of the one or more count values corresponds to a number of control message data flows associated with the host.

19. The apparatus of claim 13 wherein one of the one or more count values corresponds to a number of data flows associated with the host that have been classified according to a separate classification framework.

20. The apparatus of claim 13 further comprising computer-executable instructions for causing the one or more processors to increment one or more of the count values for the host as events are detected; and at periodic intervals:

store the current count values in a data structure as previous values for use in the accessing and determining steps; and reset the one or more count values.

* * * * *

UNITED STATES PATENT AND TRADEMARK OFFICE
CERTIFICATE OF CORRECTION

PATENT NO. : 7,957,319 B2
APPLICATION NO. : 12/463318
DATED : June 7, 2011
INVENTOR(S) : Shivani A. Deshpande et al.

It is certified that error appears in the above-identified patent and that said Letters Patent is hereby corrected as shown below:

In the Claims

Column 12, Line 30: After "when" please insert -- read --.

Signed and Sealed this
Tenth Day of December, 2013

Margaret A. Focarino
*Commissioner for Patents of the United States Patent and Trademark Office*